(12) United States Patent
Sato

(10) Patent No.: US 10,484,653 B2
(45) Date of Patent: Nov. 19, 2019

(54) IMAGING DEVICE, IMAGING METHOD, AND IMAGE PROCESSING DEVICE

(71) Applicant: SONY SEMICONDUCTOR SOLUTIONS CORPORATION, Kanagawa (JP)

(72) Inventor: Yasushi Sato, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/567,318

(22) PCT Filed: Apr. 25, 2016

(86) PCT No.: PCT/JP2016/062878
§ 371 (c)(1),
(2) Date: Oct. 17, 2017

(87) PCT Pub. No.: WO2016/178379
PCT Pub. Date: Nov. 10, 2016

(65) Prior Publication Data
US 2018/0115752 A1 Apr. 26, 2018

(30) Foreign Application Priority Data

May 7, 2015 (JP) ................. 2015-094630

(51) Int. Cl.
*H04N 9/04* (2006.01)
*H04N 5/33* (2006.01)
(Continued)

(52) U.S. Cl.
CPC ............. *H04N 9/045* (2013.01); *H04N 5/332* (2013.01); *H04N 5/3532* (2013.01);
(Continued)

(58) Field of Classification Search
CPC .................................................... H04N 5/332
See application file for complete search history.

(56) References Cited

U.S. PATENT DOCUMENTS

2006/0221253 A1* 10/2006 Kai .......................... H04N 5/21
348/701
2008/0284880 A1* 11/2008 Numata ................. H04N 5/217
348/241
(Continued)

FOREIGN PATENT DOCUMENTS

| CN | 102370462 A | 3/2012 |
|---|---|---|
| CN | 103929628 A | 7/2014 |

(Continued)

OTHER PUBLICATIONS

"Generation of Color Image in Low Illumination Scene in Which Infrared Flash and One Camera Are Used", Jul. 2011, pp. 1034-1041.

(Continued)

*Primary Examiner* — Twyler L Haskins
*Assistant Examiner* — Dwight Alex C Tejano
(74) *Attorney, Agent, or Firm* — Chip Law Group

(57) ABSTRACT

Provided is an imaging device that includes an imaging element that reads out, in a first readout period that is part of a first subframe period, first electric charge signals of pixels, read out, in a second readout period that is part of a second subframe period, second electric charge signals of the pixels, generate a first subframe image based on the first electric charge signals, and generate a second subframe image based on the second electric charge signals, an irradiation control unit that controls such that, in an irradiation period, infrared light is radiated and, in a period other than the irradiation period, infrared light is not radiated, and a color image generation unit that generates a color image at (Continued)

the predetermined frame rate based on the first subframe image and the second subframe image.

12 Claims, 14 Drawing Sheets

(51) Int. Cl.
*H04N 5/374* (2011.01)
*H04N 5/378* (2011.01)
*H04N 5/353* (2011.01)

(52) U.S. Cl.
CPC ............ *H04N 5/374* (2013.01); *H04N 5/378* (2013.01); *H04N 9/0451* (2018.08); *H04N 9/04553* (2018.08); *H04N 9/04555* (2018.08)

(56) References Cited

U.S. PATENT DOCUMENTS

| | | | |
|---|---|---|---|
| 2011/0181752 A1 | 7/2011 | Nakashima | |
| 2012/0016230 A1 | 1/2012 | Kishima et al. | |
| 2013/0002882 A1* | 1/2013 | Onozawa | H04N 5/2353 348/164 |
| 2013/0229526 A1* | 9/2013 | Matsuno | H04N 5/332 348/164 |
| 2014/0192202 A1* | 7/2014 | Sano | H04N 5/332 348/164 |
| 2014/0375846 A1 | 12/2014 | Toyoda | |
| 2016/0119594 A1* | 4/2016 | Asano | G01S 17/89 348/245 |
| 2016/0198103 A1* | 7/2016 | Tanaka | G03B 15/05 348/164 |
| 2017/0237887 A1* | 8/2017 | Tanaka | G03B 7/091 348/164 |

FOREIGN PATENT DOCUMENTS

| | | |
|---|---|---|
| EP | 2819092 A2 | 12/2014 |
| JP | 2005-130317 A | 5/2005 |
| JP | 2010-098358 A | 4/2010 |
| JP | 2010-98358 A | 4/2010 |
| JP | 2011-050049 A | 3/2011 |
| JP | 2011-233983 A | 11/2011 |
| JP | 2012-23492 A | 2/2012 |
| JP | 2012-023492 A | 2/2012 |
| JP | 2014-135627 A | 7/2014 |
| JP | 2015-007816 A | 1/2015 |
| JP | 2015-7816 A | 1/2015 |
| JP | 2016-096430 A | 5/2016 |
| JP | 2016-96430 A | 5/2016 |
| WO | 2010/044185 A1 | 4/2010 |
| WO | 2011/132241 A1 | 10/2011 |
| WO | 2016/075908 A1 | 5/2016 |

OTHER PUBLICATIONS

International Search Report and Written Opinion of PCT Application No. PCT/JP2016/062878, dated Jul. 5, 2016, 12 pages of ISRWO.

* cited by examiner

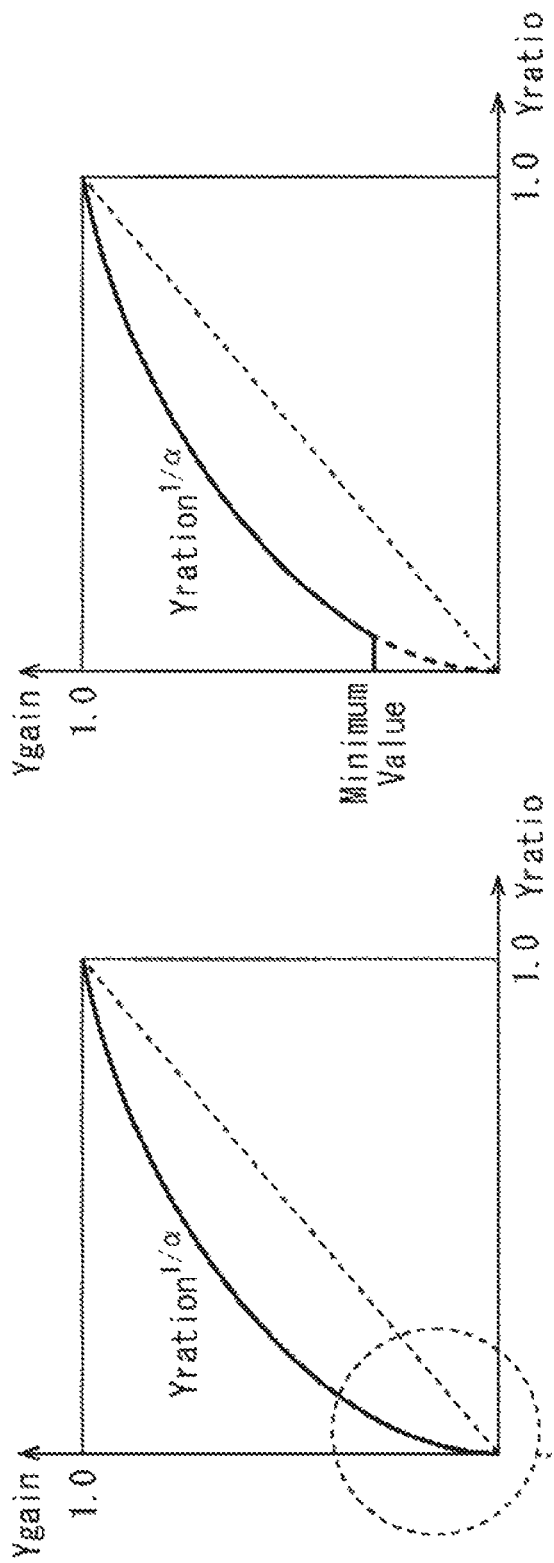

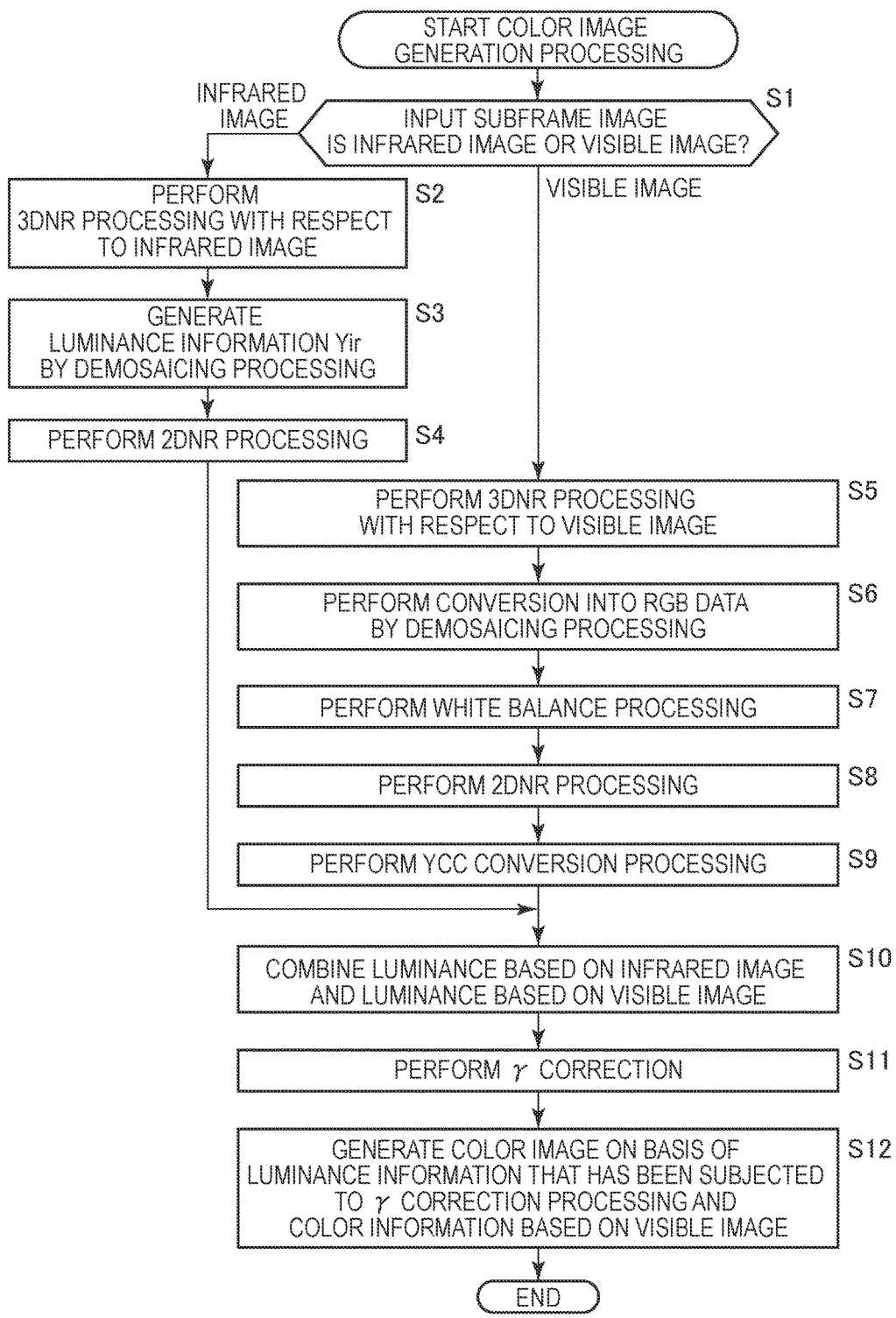

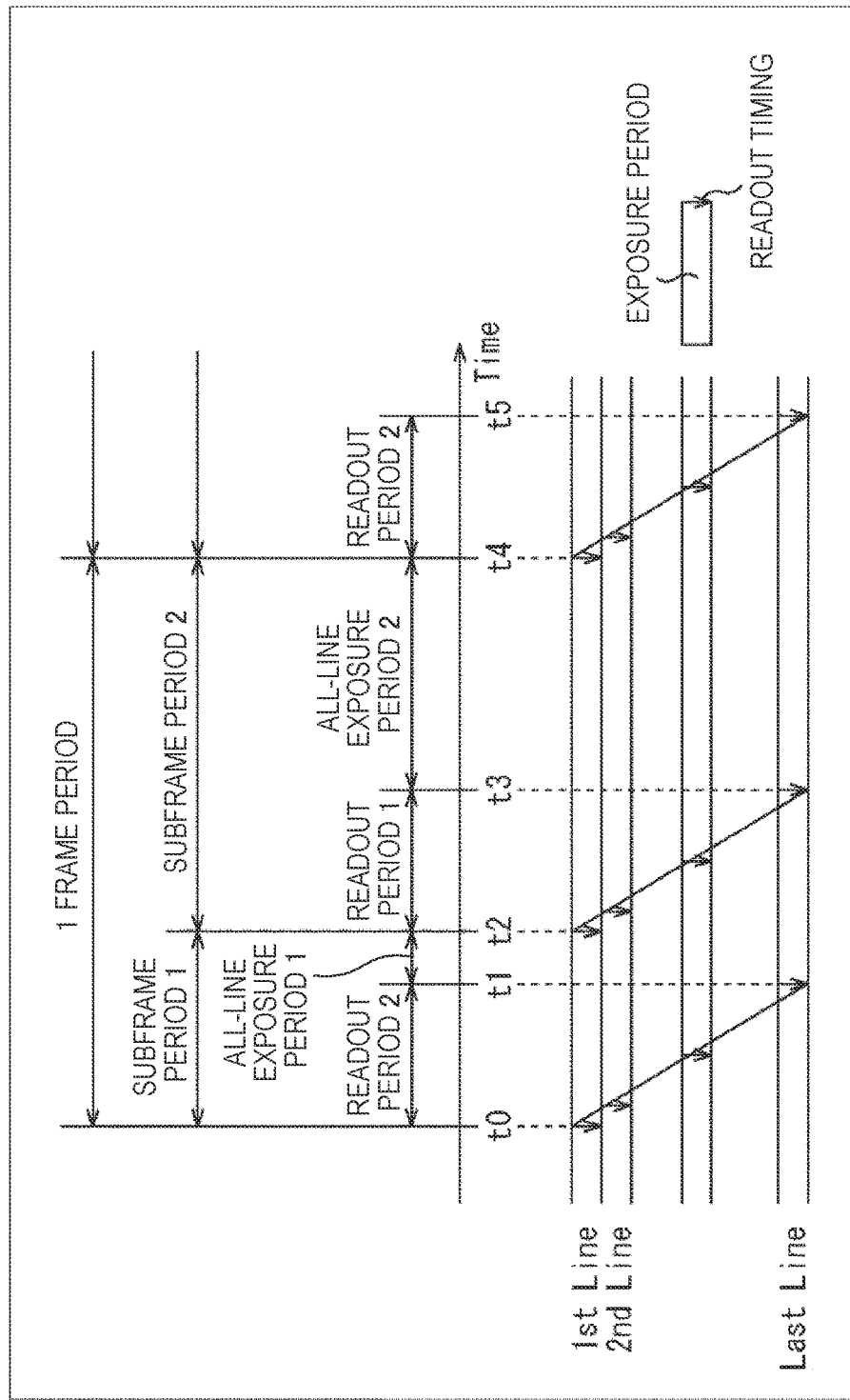

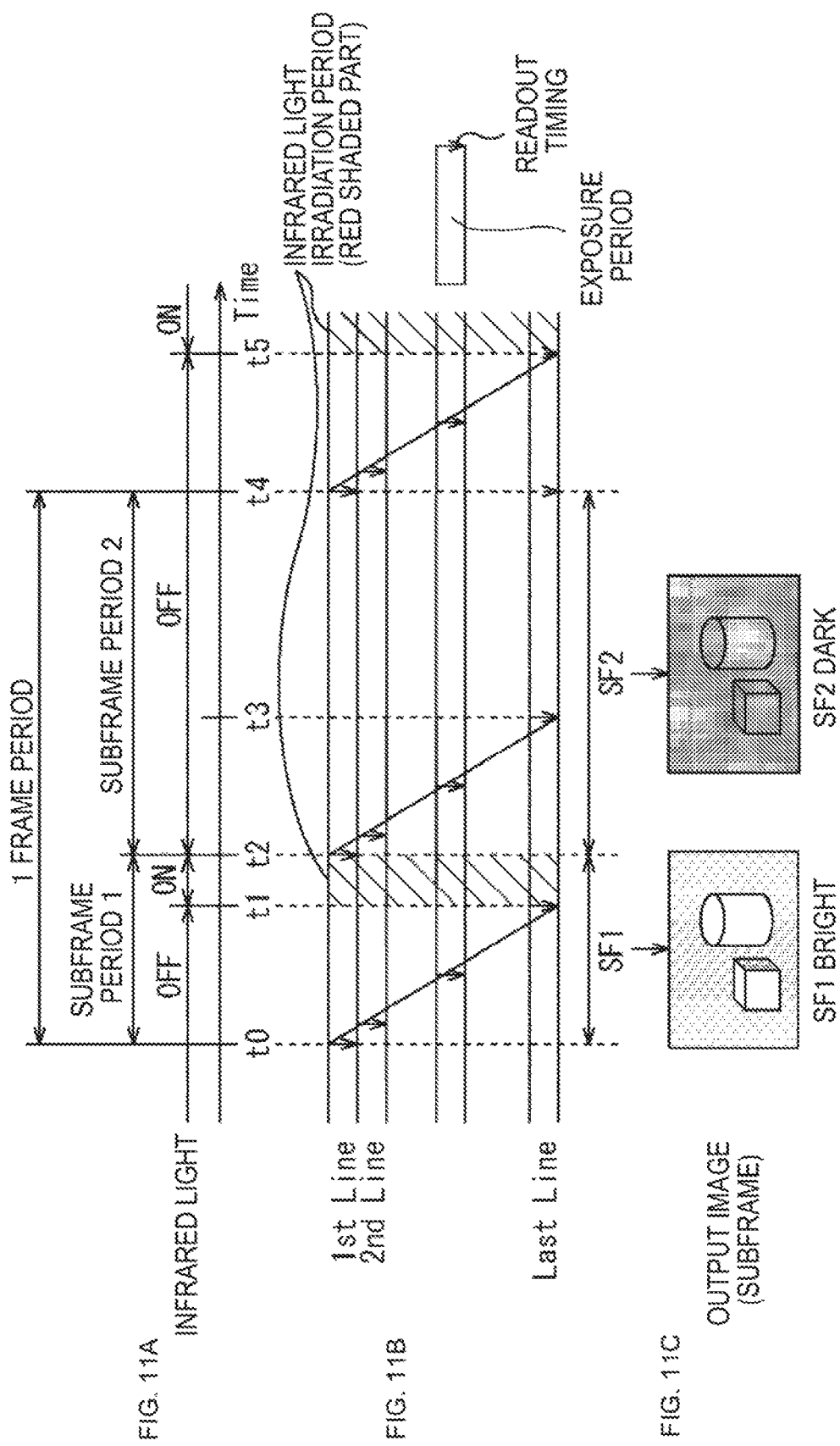

RGB-IR FILTER

RGB-IR FILTER

63

| G | R |
|---|---|
| B | W |

RGB-W FILTER
FIG. 13A

64

| W | G | W | G |
|---|---|---|---|
| B | W | R | W |
| W | G | W | G |
| R | W | B | W |

RGB-W FILTER
FIG. 13B

IMAGING DEVICE, IMAGING METHOD, AND IMAGE PROCESSING DEVICE

CROSS REFERENCE TO RELATED APPLICATIONS

This application is a U.S. National Phase of International Patent Application No. PCT/JP2016/062878 filed on Apr. 25, 2016, which claims priority benefit of Japanese Patent Application No. JP 2015-094630 filed in the Japan Patent Office on May 7, 2015. Each of the above-referenced applications is hereby incorporated herein by reference in its entirety.

TECHNICAL FIELD

The present disclosure relates to an imaging device, an imaging method, a program, and an image processing device and particularly relates to an imaging device, an imaging method, a program, and an image processing device, each of which is capable of generating a color image on the basis of an infrared image imaged by performing irradiation with infrared light.

BACKGROUND ART

There has conventionally been a monitoring camera that has two types of modes, i.e., a day mode in which imaging is performed under illumination of visible light such as natural light in the daytime or white light and a night mode in which imaging is performed while irradiation with infrared light is being performed.

In imaging in the day mode, it is possible to obtain a color image. Meanwhile, in imaging in the night mode, reflected light obtained by causing infrared light with which irradiation is performed to be reflected by a subject is received, and therefore it is impossible to obtain color information such as R, B, and G and it is possible to acquire only received light intensity of the reflected light (infrared light). Therefore, a resultant image is a monochrome image of gray, green, or the like.

By the way, in a case where use of the monitoring camera is considered, it is desirable to obtain a color image even in a case of imaging in the night mode.

In view of this, there have conventionally been proposed various methods of generating a color image on the basis of an image obtained by imaging a state in which an imaging range (subject) is irradiated with infrared light (hereinafter, referred to as "infrared image").

For example, Patent Literature 1 discloses a method of generating a color image on the basis of an infrared image obtained by performing irradiation with three types of infrared light having different wavelengths. This method uses a fact that reflectivity obtained in a case where resin is irradiated with infrared light having wavelengths of 780 nm, 870 nm, and 940 nm has a positive correlation with reflectivity obtained in a case where irradiation with visible light of R, G, and B is performed. According to this method, it is possible to obtain a color image having high color reproducibility in a case where a subject is resin.

However, in a case where a subject is not resin, an R component of a color image to be generated has comparatively high reproducibility, but, regarding G and B components, original color cannot be reproduced. Therefore, this method cannot be applied to an arbitrary subject other than resin.

Further, for example, Patent Literature 2 proposes a method of performing irradiation with infrared light and performing imaging in a state in which a subject is slight 1, y visible under, for example, illumination of low-illuminance light. In this method, an image in which visible light and infrared light are mixed is imaged, and color information is reproduced by changing a parameter of white balance processing applied to this image from a value applied to a normal image of only visible light.

However, this method has an essential problem that infrared light and visible light cannot be separated. Therefore, accuracy of color information to be reproduced is reduced due to an influence of infrared light.

Furthermore, for example, Patent Literature 3 and Non-Patent Literature 1 disclose a technology of continuously imaging an infrared image obtained in a state in which irradiation with infrared light is performed and a visible image obtained under low illuminance, i.e., in a state in which irradiation with infrared light is not performed and generating a color image by using those images.

CITATION LIST

Patent Literature

Patent Literature 1: JP 2011-50049A
Patent Literature 2: JP 2005-130317A
Patent Literature 3: JP 2011-233983A
Non-Patent Literature 1: "Generation of color image in low-illuminance scene using infrared flash and single camera", Meeting on Image Recognition and Understanding (MIRU2011), P1034.

DISCLOSURE OF INVENTION

Technical Problem

By the way, an imaging element mounted on an imaging device including a monitoring camera and the like is generally a CCD or CMOS image sensor. The CCD has a global shutter function in which all pixels are simultaneously exposed in terms of a structure thereof. Meanwhile, the CMOS image sensor has no global shutter function in terms of a structure thereof (however, a CMOS image sensor having a global shutter function also exists), and there exists a CMOS image sensor of a rolling shutter method in which an exposure time of a pixel is shifted in a line unit. Note that the rolling shutter method is also referred to as "focal-plane readout method".

In a case where an infrared image and a visible image are continuously imaged as in the technology disclosed in Patent Literature 3 and the like by using the CMOS image sensor of the focal-plane readout method, an infrared image in which irradiation time of infrared light is equal over the whole screen (all pixels) is not necessarily obtained because exposure time of pixels is shifted in a line unit. Therefore, in a case where such an infrared image is used, it is impossible to generate a color image having high color reproducibility.

Therefore, in order to image, by using the CMOS image sensor of the focal-plane readout method, an infrared image in which irradiation time of infrared light is equal over the whole screen and a visible image in which there is no influence of infrared light, some contrivances are needed regarding an irradiation timing of infrared light and an exposure timing.

The present disclosure has been made in view of such an circumstance and can generate a color image on the basis of an infrared image and a visible image imaged by using an imaging element of a focal-plane readout method.

Solution to Problem

According to a first aspect of the present disclosure, an imaging device includes: an imaging element configured to read out, in a first readout period that is part of a first subframe period in a single frame period corresponding to a predetermined frame rate, first electric charge signals of pixels in each line with a focal-plane readout method, read out, in a second readout period that is part of a second subframe period in the single frame period, second electric charge signals of the pixels in each line with the focal-plane readout method, generate a first subframe image on the basis of the first electric charge signals, and generate a second subframe image on the basis of the second electric charge signals; an irradiation control unit configured to perform control such that, in an irradiation period that is the whole or part of a period other than the first readout period in the first subframe period, an imaging range is irradiated with infrared light and, in a period other than the irradiation period, the imaging range is not irradiated with infrared light; and a color image generation unit configured to generate a color image at the predetermined frame rate on the basis of the first subframe image and the second subframe image.

The first subframe period may be shorter than the second subframe period.

Pixels in all lines may be simultaneously exposed in the period other than the first readout period in the first subframe period and a period other than the second readout period in the second subframe period.

The color image generation unit may further include a first image conversion unit configured to extract luminance information from the first subframe image, a second image conversion unit configured to extract color difference information from the second subframe image, and a third image conversion unit configured to convert the luminance information of the first subframe image and the color difference information of the second subframe image into color information of the color image.

The second image conversion unit may also extract luminance information from the second subframe image. The third image conversion unit may convert the luminance information of the first subframe image, the luminance information being corrected by using the luminance information of the second subframe image, and the color difference information of the second subframe image into the color information of the color image.

The color image generation unit may further include a first 3DNR unit configured to perform 3DNR processing including time-direction processing with respect to the first subframe image, and a second 3DNR unit configured to perform 3DNR processing including time-direction processing with respect to the second subframe image. A feedback factor in the time-direction processing in the first 3DNR unit may be different from a feedback factor in the time-direction processing in the second 3DNR unit.

The second 3DNR unit may perform the 3DNR processing with respect to the second subframe image by using a moving-subject detection result supplied from the first 3DNR unit.

The color image generation unit may further include a 2DNR unit configured to perform 2DNR processing with respect to the second subframe image by using an edge detection result supplied from the first 3DNR unit.

A light-receiving surface of the imaging element may be covered with a color filter in a Bayer array, an RGB-IR filter, or an RGB-W filter.

The imaging device may further include an infrared light irradiation unit configured to perform irradiation with the infrared light.

According to the first aspect of the present disclosure, an imaging method includes: a generation step of reading out, in a first readout period that is part of a first subframe period in a single frame period corresponding to a predetermined frame rate, first electric charge signals of pixels in each line with a focal-plane readout method, reading out, in a second readout period that is part of a second subframe period in the single frame period, second electric charge signals of the pixels in each line with the focal-plane readout method, generating a first subframe image on the basis of the first electric charge signals, and generating a second subframe image on the basis of the second electric charge signals; an irradiation control step of performing control such that, in an irradiation period that is the whole or part of a period other than the first readout period in the first subframe period, an imaging range is irradiated with infrared light and, in a period other than the irradiation period, the imaging range is not irradiated with infrared light; and a color image generation step of generating a color image at the predetermined frame rate on the basis of the first subframe image and the second subframe image.

According to the first aspect of the present disclosure, a program for causing a computer to execute processing includes a generation step of reading out, in a first readout period that is part of a first subframe period in a single frame period corresponding to a predetermined frame rate, first electric charge signals of pixels in each line with a focal-plane readout method, reading out, in a second readout period that is part of a second subframe period in the single frame period, second electric charge signals of the pixels in each line with the focal-plane readout method, generating a first subframe image on the basis of the first electric charge signals, and generating a second subframe image on the basis of the second electric charge signals, an irradiation control step of performing control such that, in an irradiation period that is the whole or part of a period other than the first readout period in the first subframe period, an imaging range is irradiated with infrared light and, in a period other than the irradiation period, the imaging range is not irradiated with infrared light, and a color image generation step of generating a color image at the predetermined frame rate on the basis of the first subframe image and the second subframe image.

According to the first aspect of the present disclosure, in a first readout period that is part of a first subframe period in a single frame period corresponding to a predetermined frame rate, first electric charge signals of pixels in each line is read out with a focal-plane readout method, in a second readout period that is part of a second subframe period in the single frame period, second electric charge signals of the pixels in each line is read out with the focal-plane readout method, a first subframe image is generated on the basis of the first electric charge signals, and a second subframe image is generated on the basis of the second electric charge signals; control is performed such that, in an irradiation period that is the whole or part of a period other than the first readout period in the first subframe period, an imaging range is irradiated with infrared light and, in a period other than the irradiation period, the imaging range is not irradiated with infrared light; and a color image generation unit configured to generate a color image at the predetermined frame rate on the basis of the first subframe image and the second subframe image.

According to a second aspect of the present disclosure, an image processing device accepts input of a first subframe image and a second subframe image from an imaging element configured to read out, in a first readout period that is part of a first subframe period in a single frame period corresponding to a predetermined frame rate, first electric charge signals of pixels in each line with a focal-plane readout method, read out, in a second readout period that is part of a second subframe period in the single frame period, second electric charge signals of the pixels in each line with the focal-plane readout method, generate the first subframe image on the basis of the first electric charge signals, and generate the second subframe image on the basis of the second electric charge signals, the image processing device including: an irradiation control unit configured to perform control such that, in an irradiation period that is the whole or part of a period other than the first readout period in the first subframe period, an imaging range is irradiated with infrared light and, in a period other than the irradiation period, the imaging range is not irradiated with infrared light; and a color image is generated at the predetermined frame rate on the basis of the first subframe image and the second subframe image.

According to the second aspect of the present disclosure, control is performed such that, in an irradiation period that is the whole or part of a period other than the first readout period in the first subframe period, an imaging range is irradiated with infrared light and, in a period other than the irradiation period, the imaging range is not irradiated with infrared light; and e a color image is generated at the predetermined frame rate on the basis of the first subframe image and the second subframe image.

Advantageous Effects of Invention

According to the first and second aspects of the present disclosure, it is possible to generate a color image having high color reproducibility.

BRIEF DESCRIPTION OF DRAWINGS

FIGS. 8A and 8B are views showing an example of a function used in a gain conversion unit.

FIG. 9 is a flowchart showing color image generation processing.

FIG. 10 is a view showing a second example of exposure periods and readout timings of electric charge signals.

FIGS. 11A, 11B and 11C are views showing a second example of irradiation timings of infrared light.

FIGS. 13A and 13B are views showing a modification example of arrangement of color in a color filter of a CMOS.

MODE(S) FOR CARRYING OUT THE INVENTION

Hereinafter, a best mode for implementing the present disclosure (hereinafter, referred to as "embodiment") will be described in detail with reference to the drawings.
<Example Configuration of Imaging Device that is Embodiment of Present Disclosure>

Figure 1:
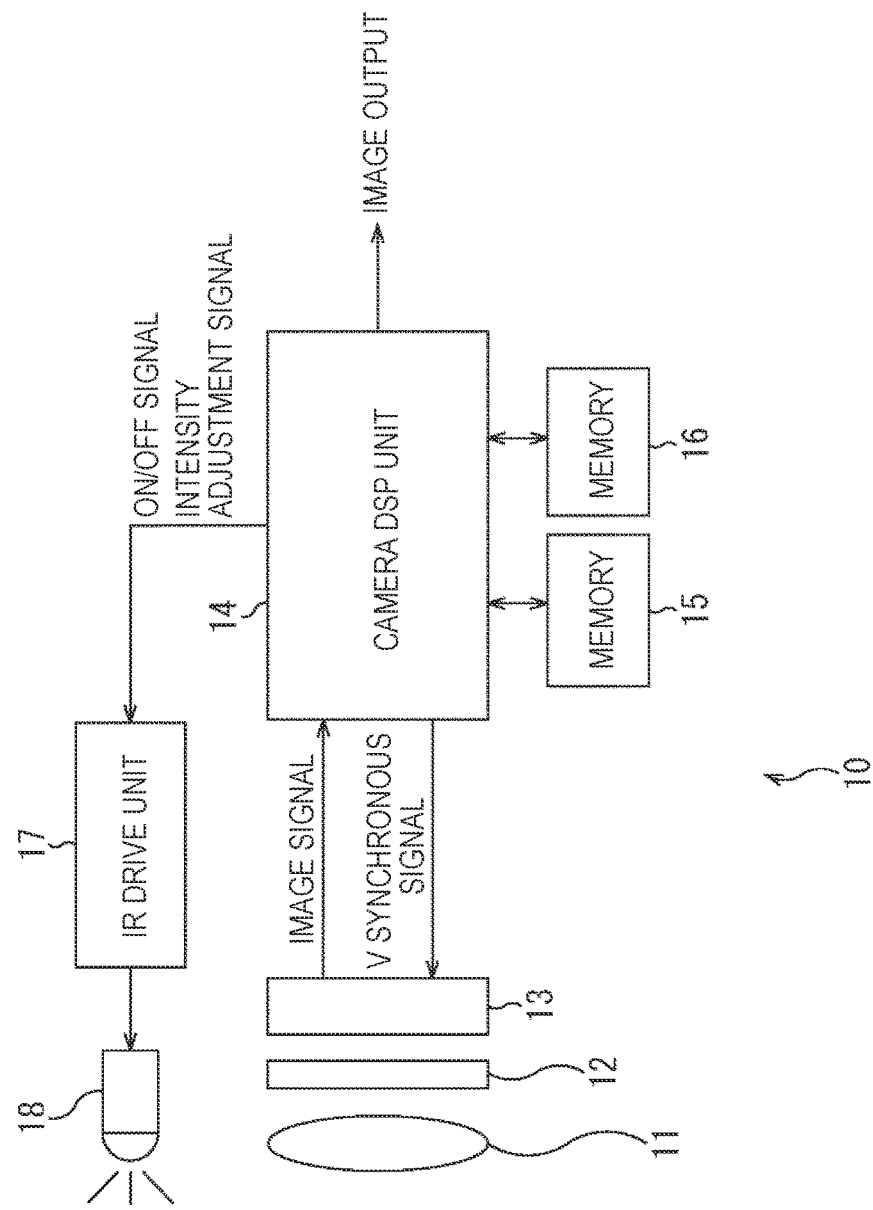
FIG. 1 is a block diagram showing an example configuration of an imaging device to which the present disclosure is applied.

FIG. 1 shows an example configuration of an imaging device that is an embodiment of the present disclosure.

This imaging device 10 is used for, for example, a monitoring camera and generates a color image on the basis of an infrared image obtained in a state in which irradiation with infrared light is performed and a visible image obtained under low illuminance, i.e., in a state in which irradiation with infrared light is not performed.

The imaging device 10 is made up of an imaging system configured in the same way as a general camera, an image processing system for implementing image processing, and a light projection system for irradiating an imaging range with infrared light.

The imaging system of the imaging device 10 is made up of a lens 11, an IR bandpass filter 12, and a CMOS image sensor (hereinafter, abbreviated as "CMOS") 13 of a focal-plane readout method (rolling shutter method). In the imaging system, the lens 11 collects light of an optical image of a subject to the CMOS 13, the IR bandpass filter 12 arranged between the lens 11 and the CMOS 13 extracts a visible light component and an infrared light component from the optical image of the subject, and the CMOS 13 generates an image signal based on incident light and outputs the image signal to the image processing system.

Figure 2:
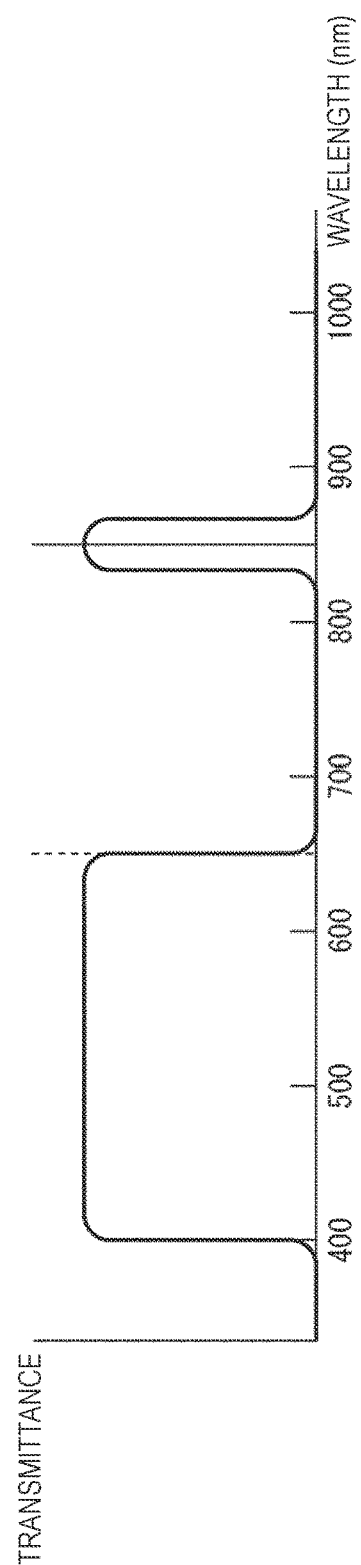
FIG. 2 is a view showing a transmission characteristic of an IR bandpass filter.

FIG. 2 shows a transmission characteristic of the IR bandpass filter 12. The IR bandpass filter 12 has high transmittance with respect to visible light having wavelengths from 400 nm to 650 nm and infrared light having a peak at a wavelength of 850 nm (infrared light emitted by the light projection system).

Figure 3:
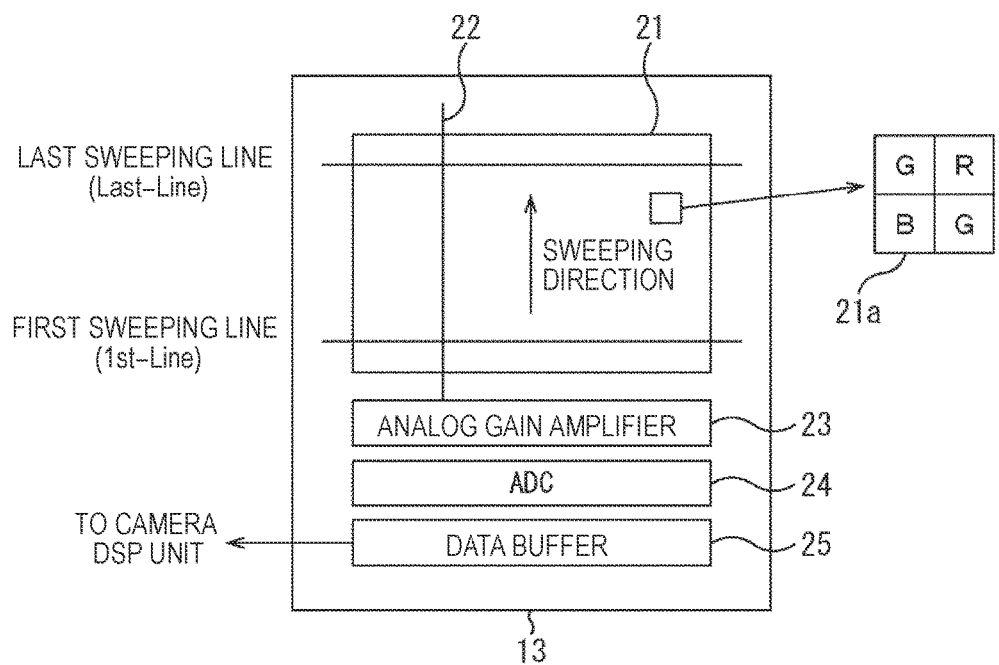
FIG. 3 is a block diagram showing an example configuration of a CMOS image sensor.

FIG. 3 shows an example configuration of the CMOS 13. This CMOS 13 includes a sensor array 21, signal lines 22, an analog gain amplifier 23, an ADC 24, and a data buffer 25. The sensor array 21 is made up of photoelectric conversion elements for respective pixels arranged lengthwise and breadthwise, and a light-receiving surface side thereof is covered with color filters 21a in a Bayer array or the like.
<First Example of Exposure Periods and Readout Timings of Electric Charge Signals in CMOS 13>

Figure 4:
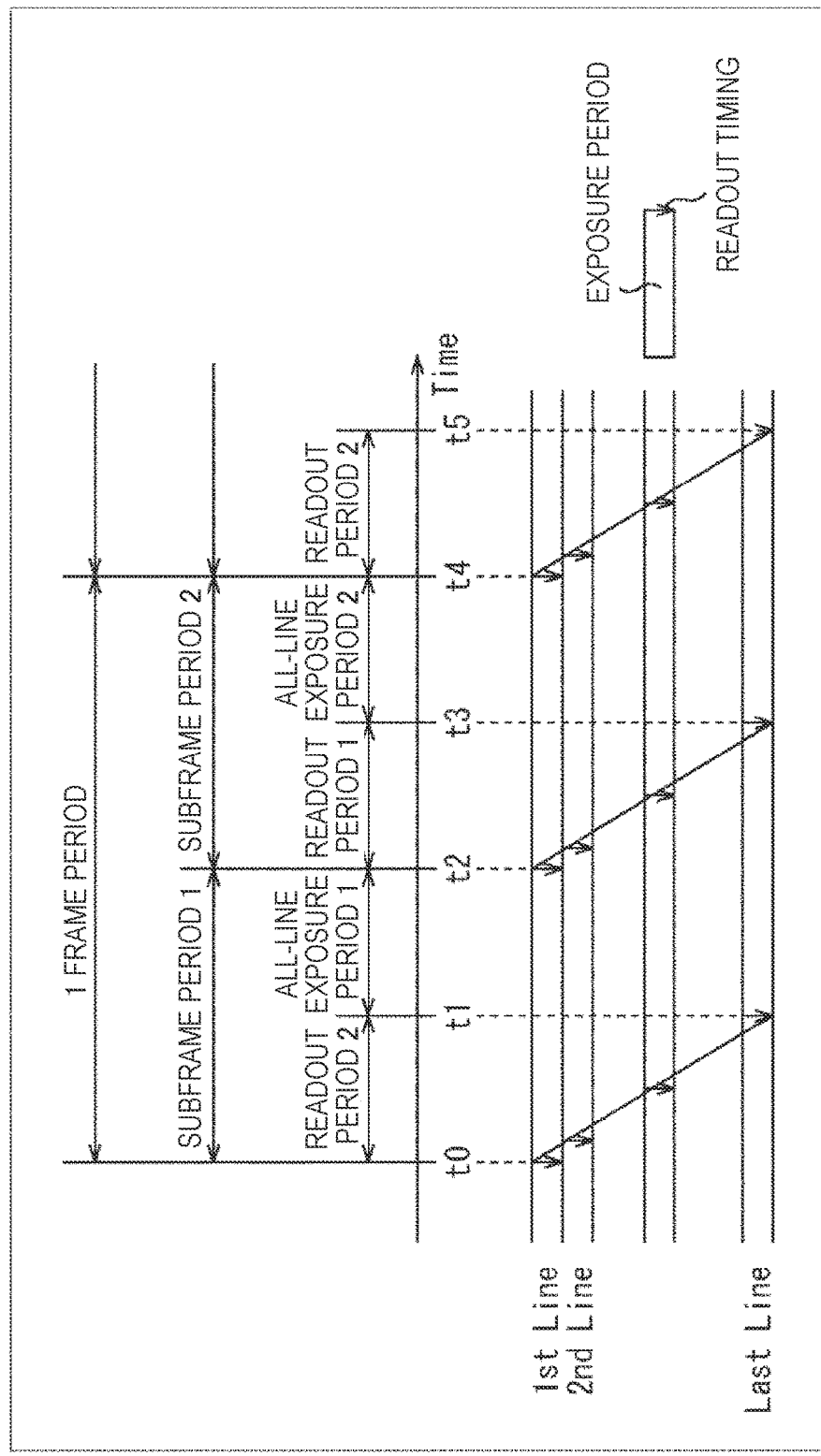
FIG. 4 is a view showing a first example of exposure periods and readout timings of electric charge signals.

FIG. 4 shows a first example of exposure periods of each line in the sensor array 21 of the CMOS 13 and readout timings of electric charge signals obtained in the exposure periods. As shown in FIG. 4, in the CMOS 13, exposure periods are shifted in a line unit in a sweeping direction from a first sweeping line (1st-Line) to a last sweeping line (Last-Line) in the sensor array 21, and, at a timing at which an exposure period is terminated, electric charge signals obtained in the exposure period are collectively read out in each line.

Further, in the CMOS 13, a single frame period (1/30 second in a case of 30 fps) of a frame rate (for example, 30 fps) of a color image to be finally output is divided into two subframe periods (1/60 second in a case of 30 fps). Then, in each subframe period, electric charge signals are read out in a line unit in order in the sweeping direction of the sensor array 21, and a subframe image based on the read-out electric charge signals is output from the CMOS 13. Therefore, two subframe images are output from the CMOS 13 in a single frame period.

For example, an exposure period of the firs sweeping t line of the sensor array 21 is terminated at a time t0, and electric charge signals obtained in the exposure period are read out. The electric charge signals read out at this time are electric charge signals of a second subframe of a previous n−1 frame. After the electric charge signals are read out, a new exposure period in the first sweeping line of the sensor array 21 is started.

Thereafter, exposure periods of the respective lines in the sensor array 21 are terminated at predetermined time intervals in order in the sweeping direction, and electric charge signals obtained in the exposure periods are read out, and then new exposure periods are started. Then, at a time t1, an exposure period of the last sweeping line of the sensor array 21 is terminated, and electric charge signals obtained in the exposure period are read out, and then a new exposure period is started.

As described above, in a period from the time t0 to the time t1, electric charge signals in the respective lines of a second subframe of the n−1 frame are read out at predetermined time intervals in order in the sweeping direction. Then, a second subframe image SF2 of the n−1 frame is generated on the basis of the read out electric charge signals and is output from the CMOS 13. Further, exposure periods of the respective lines in the sensor array 21 are started at predetermined time intervals in order in the sweeping direction.

Next, in a period from the time t1 to a time t2, pixels in all the lines of the sensor array 21 are simultaneously exposed, and electric charge is accumulated in all pixels.

Next, an exposure period of the first sweeping line of the sensor array 21 is terminated at the time t2, and electric charge signals obtained in the exposure period are read out. The electric charge signals read out at this time are electric charge signals of a first subframe of an n frame. After electric charge signals are read out, a new exposure period of the first sweeping line in the sensor array 21 is started.

Thereafter, in a period from the time t2 to a time t3, as well as in the period from the time t0 to the time 1, electric charge signals in the respective lines of the first subframe of the n frame are read out at predetermined time intervals in order in the sweeping direction. Then, a first subframe image SF1 of the n frame is generated on the basis of the read-out electric charge signals and is output from the CMOS 13. Further, new exposure periods of the respective lines in the sensor array 21 are started at predetermined time intervals in order in the sweeping direction.

Next, in a period from the time t3 to a time t4, the pixels in all the lines of the sensor array 21 are simultaneously exposed, and electric charge is accumulated in all the pixels.

Next, at the time t4, an exposure period of the first sweeping line in the sensor array 21 is terminated, and electric charge signals obtained in the exposure period are read out. The electric charge signals read out at this time are electric charge signals of a second subframe of the n frame. After the electric charge signals are read out, a new exposure period of the first sweeping line in the sensor array 21 is started.

Thereafter, in a period from the time t4 to a time t5, as well as in the period from the time t0 to the time 1, electric charge signals in the respective lines of the second subframe of the n frame are read out at predetermined time intervals in order in the sweeping direction. Then, a second subframe image SF2 of the n frame is generated on the basis of the read-out electric charge signals and is output from the CMOS 13. Further, new exposure periods of the respective lines in the sensor array 21 are started at predetermined time intervals in order in the sweeping direction.

By repeating the above processing, exposure of each frame, readout of electric charge signals, and generation and output of the subframe image SF1 and the subframe image SF2 are performed.

Note that, hereinafter, as shown in FIG. 4, a period from the time t0 to the time t4 is defined as a single frame period. That is, the single frame period is a period between start of exposure in a first sweeping line of a first subframe of a certain frame and termination of exposure in a first sweeping line of a second subframe of the same frame.

Further, hereinafter, a period from the time t0 to the time t2 is defined as a subframe period 1. That is, the subframe period 1 is a period between start of exposure in a first sweeping line of a first subframe of a certain frame and termination of exposure in the first sweeping line thereof.

Furthermore, hereinafter, a period from the time t2 to the time t4 is defined as a subframe period 2. That is, the subframe period 2 is a period between start of exposure in a first sweeping line of a second subframe of a certain frame and termination of exposure in the first sweeping line thereof.

Further, hereinafter, a period from the time t2 to the time t3, which is part of the subframe period 1, is defined as a readout period 1. That is, the readout period 1 is a period between start of readout of electric charge signals in a first sweeping line of a first subframe of a certain frame and termination of readout of electric charge signals in a last sweeping line thereof. In other words, the readout period 1 is a period in which electric charge signals for generating a subframe image SF1 are read out.

Furthermore, hereinafter, a period from the time t0 to the time t1, which is part of the subframe period 2, and a period from the time t4 to the time t5 are defined as a readout period 2. That is, the readout period 2 is a period between start of readout of electric charge signals in a first sweeping line of a second subframe of a certain frame and termination of readout of electric charge signals in a last sweeping line thereof. In other words, the readout period 2 is a period in which electric charge signals for generating a subframe image SF2 are read out.

Further, hereinafter, a period from the time t1, to the time t2, which is a period other than the readout period 2 in the subframe period 1, is defined as an all-line exposure period 1. That is, the all-line exposure period 1 is a period between start of exposure in a last sweeping line of a first subframe of a certain frame and termination of exposure in a first sweeping line thereof. In other words, in a period in which a subframe image SF1 of a certain frame is exposed, the all-line exposure period 1 is a period in which the pixels in all the lines of the sensor array 21 are simultaneously exposed.

Furthermore, hereinafter, a period from the time t3 to the time t4, which is a period other than the readout period 1 in the subframe period 2, is defined as an all-line exposure period 2. That is, the all-line exposure period 2 is a period between start of exposure in a last sweeping line of a second subframe of a certain frame and termination of exposure in a first sweeping line thereof. In other words, in a period in which a subframe image SF2 of a certain frame is exposed, the all-line exposure period 2 is a period in which the pixels in all the lines of the sensor array 21 are simultaneously exposed.

Note that the subframe period 1 and the subframe period 2, the readout period 1 and the readout period 2, and the all-line exposure period 1 and the all-line exposure period 2 are set to have the same length.

Herein, the readout period 1 is shorter than the subframe period 2, and the readout period 2 is shorter than the subframe period 1. That is, in the CMOS 13, readout of electric charge signals in all the lines of the sensor array 21 is completed earlier than a subframe rate that uses a subframe as a unit.

Description returns to FIG. 3. Read-out electric charge signals are output to the analog gain amplifier 23 via the signal lines 22 and are amplified therein, are converted into digital pixel signals in the ADC 24, and are stored on the data buffer 25.

Note that it is possible to adaptively set a gain in the analog gain amplifier 23 in accordance with illumination. Then, pixel signals of all the pixels constituting the sensor array 21 are output as image signals to the image processing system at the latter stage. Note that the image signals at this stage are RAW data in which each pixel has color information of any of R, G, and B.

Description returns to FIG. 1. The image processing system of the imaging device 10 is made up of a camera DSP unit 14 and memories 15 and 16. In the image processing system, the camera DSP unit 14 generates a color image in which each pixel has color information of R, G, or B on the basis of image signals from the imaging system. The image signals used for noise reduction (NR) processing are temporarily held in the memories 15 and 16. Further, the camera DSP unit 14 generates and outputs a V synchronous signal for controlling drive (exposure and readout) of the CMOS 13 of the imaging system. Furthermore, the camera DSP unit 14 generates and outputs driver signals (ON/OFF signal and intensity adjustment signal) for controlling the light projection system.

The light projection system of the imaging device 10 is made up of an IR drive unit 17 and an IR irradiation unit 18. In the light projection system, the IR drive unit 17 causes the IR irradiation unit 18 to perform irradiation with infrared light in accordance with control from the camera DSP unit 14. The IR irradiation unit 18 irradiates an imaging range with infrared light having a peak at a wavelength 850 nm. Note that the IR irradiation unit 18 may be arranged inside a housing of the imaging device 10 or may be arranged outside the housing of the imaging device 10.

<First Example of Irradiation Timing of Infrared Light in Light Projection System>

Figure 5:
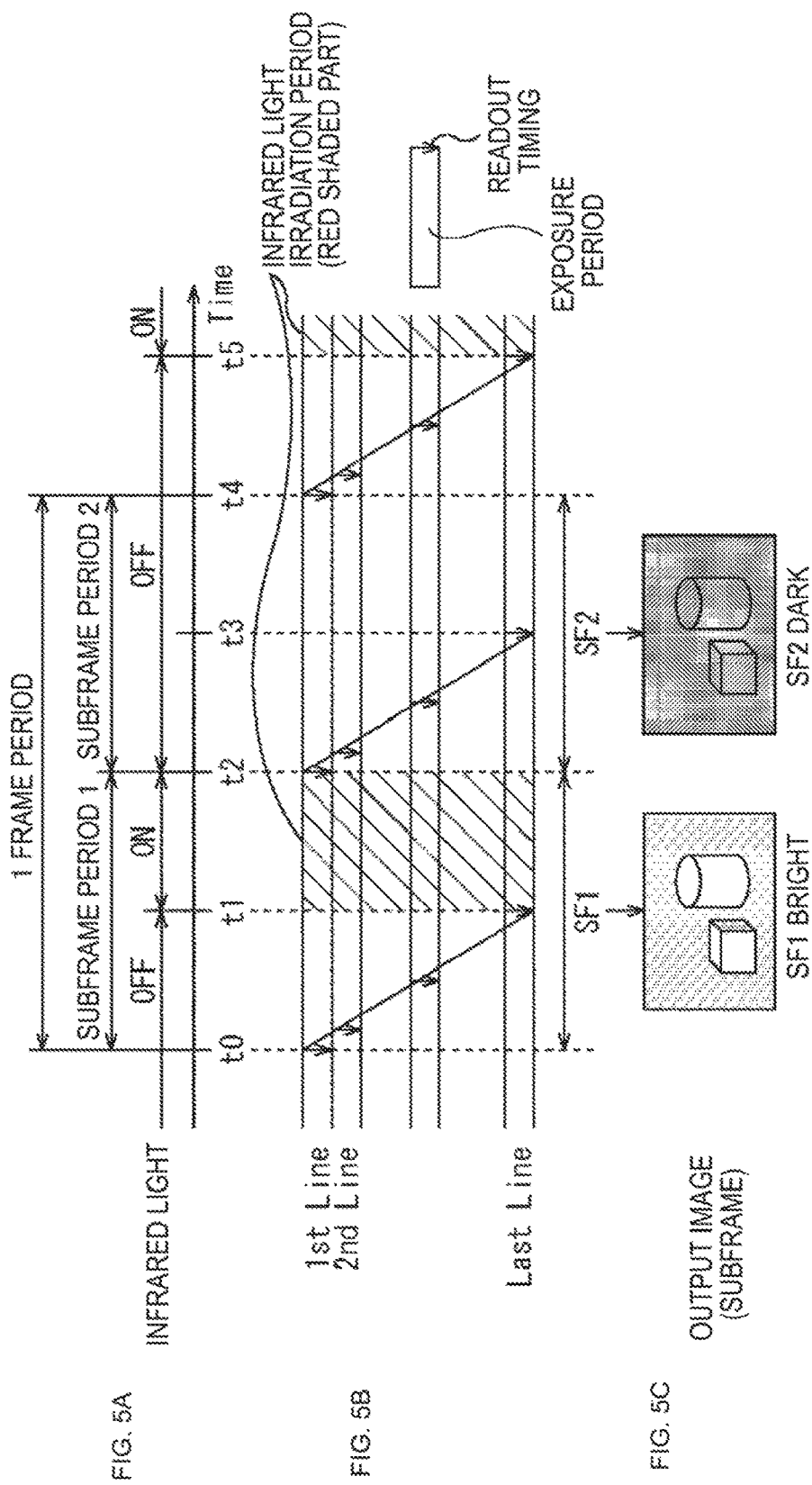
FIGS. 5A, 5B and 5C are views showing a first example of irradiation timings of infrared light.

Next, FIGS. 5A, 5B and 5C show a first example of an irradiation timing of infrared light in the light projection system. This irradiation timing is set in accordance with the first example of exposure periods and readout timings of electric charge signals in the CMOS 13 of FIG. 4.

For example, as shown in FIGS. 5A, 5B and 5C, the IR irradiation unit 18 causes irradiation with infrared light to be on in the period from the time t1 to the time t2 (all-line exposure period 1) under control of the IR drive unit 17. That is, an irradiation period of infrared light is set in the whole period of a period (all-line exposure period 1) other than the readout period 2 in the subframe period 1. Then, an imaging range is irradiated with infrared light in an exposure period of the subframe image SF1, which is a period in which the pixels in all the lines of the sensor array 21 are simultaneously exposed.

Meanwhile, the IR irradiation unit 18 causes irradiation with infrared light to be off in a period other than the all-line exposure period 1 under control of the IR drive unit 17. That is, irradiation with infrared light is not performed in an exposure period of the subframe image SF1, which is a period in which electric charge signals in any one of the lines in the sensor array 21 are read out. Further, irradiation with infrared light is not performed over the whole exposure period of the subframe image SF2.

Therefore, in this first example, irradiation with infrared light is on over the whole period (all-line exposure period 1) in which the pixels in all the lines are simultaneously exposed, and therefore the subframe image SF1 is an image in which the whole screen is equally bright. Further, in the CMOS sensor of the focal-plane readout method, shift in a vertical direction, which is shift of a moving subject that moves at a high speed (which is caused because exposure periods in the respective lines are shifted), is problematic. However, regarding the subframe image SF1, the irradiation period of infrared light is the same in all the lines, and therefore there is a merit in not causing shift in the vertical direction. Furthermore, exposure time is shorter than a single frame period, and therefore the subframe image SF1 is an image in which movement blurring of the moving subject is suppressed.

Meanwhile, irradiation with infrared light is off over the whole exposure period of all the lines, and therefore the subframe image SF2 is an image only based on visible light, which is an image in which the whole screen is dark.

Note that, hereinafter, the subframe image SF1 is also referred to as "infrared image", and the subframe image SF2 is also referred to as "visible image".

Then, the camera DSP unit 14 generates a color image by using two subframe images, i.e., the subframe image SF1 (infrared image) and the subframe image SF2 (visible image), in each frame period.

<Example Configuration of Camera DSP Unit 14>

Figure 6:
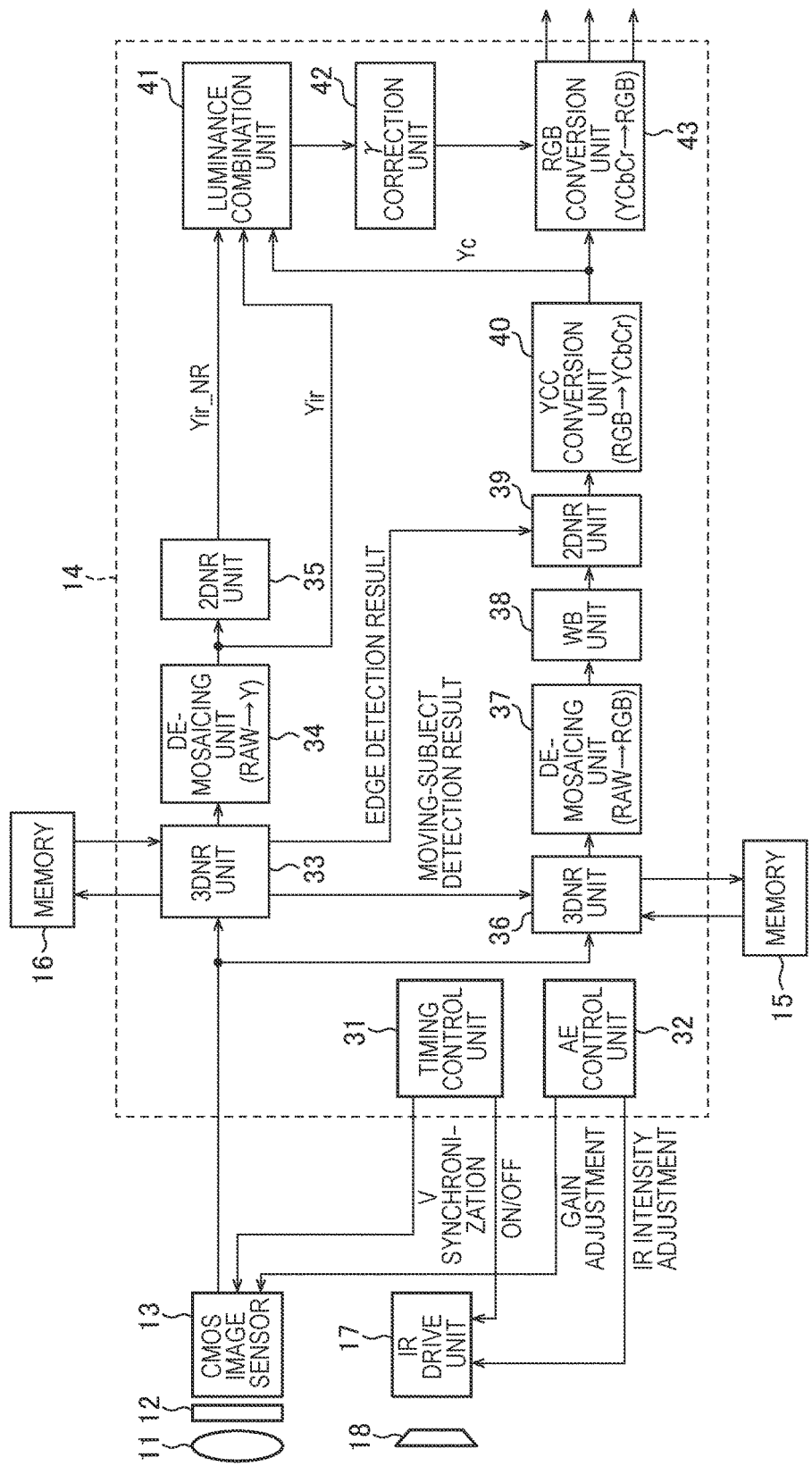
FIG. 6 is a block diagram showing an example configuration of a camera DSP unit.

Next, FIG. 6 shows an example configuration of the camera DSP unit 14. The camera DSP unit 14 is made up of not only a timing control unit 31 and an AE control unit 32 but also an infrared image processing system, a visible image processing system, and a color image generation system.

The timing control unit 31 generates a V synchronous signal for controlling drive of the CMOS 13 and an ON/OFF signal for controlling the IR drive unit 17. The AE control unit 32 generates a gain adjustment signal for controlling the analog gain amplifier 23 in the CMOS 13 and an intensity signal for controlling the IR drive unit 17. As described above, the timing control unit 31 and the AE control unit 32 constitute an imaging control unit for controlling imaging performed by the CMOS 13 and an irradiation control unit for controlling irradiation with infrared light performed by the IR irradiation unit 18.

Between two subframe images input from the CMOS 13 in each frame period, the infrared image processing system of the camera DSP unit 14 sets an infrared image (subframe image SF1) as a target to be processed and is made up of a 3DNR unit 33, a demosaicing unit 34, and a 2DNR unit 35.

The 3DNR unit 33 performs 3DNR processing in which 2DNR processing for two-dimensionally removing noise by performing filtering processing of each pixel of the infrared image (subframe image SF1) input from the CMOS 13 and a peripheral pixel thereof and time-direction processing for performing weighted averaging of the infrared image input from the CMOS 13 and the past (a single or more frame periods before) infrared image that has been subjected to 3DNR processing, the past infrared image being held in the memory 16, are combined. Note that a weighting value of a current infrared image in the time-direction processing is referred to as "feedback factor", and the feedback factor herein has a value larger than a value of a feedback factor in a 3DNR unit 36 described below. For example, the feedback factor in the 3DNR unit 36 is set to ⅛, and a feedback factor in the 3DNR unit 33 is set to ½.

Further, generally, in the time-direction processing in the 3DNR processing, when a feedback factor of a current image is reduced, a noise removal effect is improved. However, components of the past image tend to remain, and therefore a residual image is generated at, for example, an edge of a moving subject. In view of this, in order to avoid this, in the 3DNR unit 33, the following procedure is performed: a moving subject is detected by using an inter-subframe difference, and, regarding a moving subject part in the image, a feedback factor of a current image is increased to suppress generation of a residual image. Herein, the 3DNR unit 36 is notified of a detected moving-subject detection result, and a 2DNR unit 39 is notified of an edge detection result.

The infrared image that has been subjected to the 3DNR processing in the 3DNR unit 33 is output to the demosaicing unit 34 and is overwritten and recorded on the memory 16.

The demosaicing unit 34 extracts luminance information Yir of each pixel from the infrared image (RAW data) that has been subjected to the 3DNR processing and outputs the luminance information to the 2DNR unit 35 and a luminance combination unit 41. Specifically, pixel values of the RAW data are set as the luminance information Yir as they are, or pixel values of R, G, and B of peripheral pixels are added and are set as the luminance information Yir.

The 2DNR unit 35 performs two-dimensional noise reduction processing with respect to the luminance information Yir of the infrared image, thereby extracting a low-frequency component thereof, and outputs luminance information Yir_NR obtained as a result thereof to the luminance combination unit 41.

Between two subframe images input from the CMOS 13 in each frame period, the visible image processing system of the camera DSP unit 14 sets a visible image (subframe image SF2) as a target to be processed and is made up of the 3DNR unit 36, a demosaicing unit 37, a white balance (WB) unit 38, the 2DNR unit 39, and a YCC conversion unit 40.

The 3DNR unit 36 performs 3DNR processing in which 2DNR processing for two-dimensionally removing noise by performing filtering processing of each pixel of the visible image (subframe image SF2) input from the CMOS 13 and a peripheral pixel thereof and time-direction processing for performing weighted averaging of the visible image input from the CMOS 13 and the past (a single or more frame periods before) visible image that has been subjected to 3DNR processing, the past infrared image being held in the memory 15, are combined. However, the visible image input to the 3DNR unit 36 is a low-illuminance image having much noise, and therefore, even in a case where a moving subject is detected from this visible image for the time-direction processing, movement and noise cannot be distinguished, and thus the moving subject cannot be appropriately detected. In view of this, in the 3DNR unit 36, the time-direction processing is performed by using the moving-subject detection result detected from the infrared image, the moving-subject detection result being supplied from the 3DNR unit 33. Further, the feedback factor in the 3DNR unit 36 is, for example, a value ⅛, which is smaller than the feedback factor in the 3DNR unit 33 (for example, ½). With this, in the 3DNR unit 36, it is possible to satisfactorily remove noise while suppressing a residual image of the moving subject.

The demosaicing unit 37 converts image signals (RAW data) that have been subjected to the 3DNR processing into RGB data in which each pixel has R, G, or B color information and outputs the RGB data to the WB unit 38. The WB unit 38 performs white balance processing with respect to the image signals (RGB data) and outputs the image signals to the 2DNR unit 39.

The 2DNR unit 39 performs, for example, two-dimensional noise reduction processing (2DNR processing) using a wideband filter such as a c filter and performs output to the YCC conversion unit 40. Note that, in a case where the 2DNR processing is performed, an edge of a subject is detected and the wideband filter is applied only to the inside of the edge, and therefore it is possible to prevent drawing of different color information of the outside of the edge. However, the visible image supplied to the 2DNR unit 39 is a low-illuminance image having much noise, and therefore the edge cannot be appropriately detected. In view of this, in the 2DNR unit 39, the 2DNR processing is performed by using the edge detection result detected from the infrared image, the edge detection result being supplied from the 3DNR unit 33. With this, in the 2DNR unit 39, it is possible to perform two-dimensional noise reduction processing using the wideband filter, without mixing color in the vicinity of the edge.

The YCC conversion unit 40 converts the visible image (RGB data) that has been subjected to the 2DNR processing into a visible image (YCC data) in which each pixel has luminance information Y and color difference information Cb and Cr, outputs the luminance information Y (hereinafter, referred to as "Yc") to the luminance combination unit 41, and outputs the color difference information Cb and Cr to an RGB conversion unit 43.

The color image generation system of the camera DSP unit 14 uses output of the infrared image processing system and the visible image processing system as a target to be processed and is made up of the luminance combination unit 41, a γ correction unit 42, and the RGB conversion unit 43.

The luminance combination unit 41 combines luminance signals of a color image to be generated at the latter stage on the basis of the luminance information Yir and the luminance information Yir_NR of the infrared image input from the infrared image processing system and the luminance information Yc of the visible image input from the visible image processing system.

Note that, in a case where the luminance information Yir of the infrared image is used as luminance signals of the color image as it is, without passing through the luminance combination unit 41, color reproduction is deteriorated due to difference in luminance information in a subject in which reflectivity of infrared light is greatly different from reflectivity of visible light. In a case where, in, for example, black clothes having high infrared reflectivity (reflectivity of visible light is low), Yir is used as luminance information as it is, the black clothes become white clothes in an output image. Because the luminance combination unit 41 is provided, it is possible to prevent such a problem.

Figure 7:
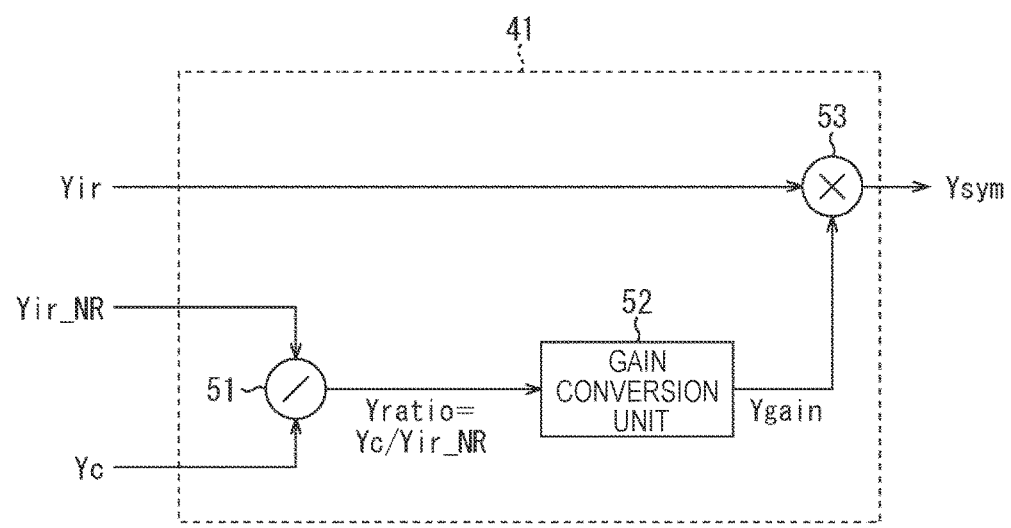
FIG. 7 is a block diagram showing an example configuration of a movement combination unit.

FIG. 7 shows a detailed configuration example of the luminance combination unit 41. The luminance combination unit 41 is made up of a division unit 51, a gain conversion unit 52, and a multiplication unit 53. The division unit 51 calculates a ratio of the luminance information Yc in a low frequency band of the visible image to the luminance information Yir_NR in a low frequency band of the infrared image, i.e., Y ratio=Yc/Yir_NR, and outputs the obtained ratio Y ratio to the gain conversion unit 52. The gain conversion unit 52 converts the ratio Y ratio to a Y gain and outputs the Y gain to the multiplication unit 53 in accordance with a predetermined function (or held conversion table).

Herein, the function used in the gain conversion unit 52 will be described. In the luminance combination unit 41, basically, processing for modulating Yir with Yc signals is performed by multiplying the ratio Y ratio by the luminance information Yir of the original infrared image. However, when the ratio is merely multiplied by the luminance information, the whole screen tends to be dark, and, in addition, a modulation degree using Yc cannot be adjusted. In view of this, in the gain conversion unit 52, the ratio Y ratio is converted into a Y gain by using a nonlinear function curve.

FIG. 8A shows an exponential function similar to a gamma curve as an example of a nonlinear function used in the gain conversion unit 52. In this case, it is possible to adjust the modulation degree by selecting an index value $\alpha$. For example, when a value of $\alpha$ is increased, the Y gain becomes close to 1 as a whole, and the modulation degree is decreased. On the contrary, when the value of $\alpha$ is decreased, the Y gain deviates from 1, and the modulation degree is increased.

However, in the exponential function curve shown in FIG. 8A, inclination is steep in a region in which a value of the Y ratio is small, and therefore the Y gain is greatly changed due to a slight difference in the Y ratio, which may cause amplification of noise. In view of this, in order to avoid such a problem, as shown in FIG. 8B, the Y gain is clipped (minimum value is set) in the region in which the Y ratio is small. Note that, instead of using such a function, a conversion table prepared in advance may be held by the gain conversion unit 52.

Description returns to FIG. 7. The multiplication unit 53 calculates luminance information Ysym by multiplying the Y gain by the luminance information Yir of the infrared image and outputs the luminance information to the $\gamma$ correction unit 42 at the latter stage.

Description returns to FIG. 6. The $\gamma$ correction unit 42 performs $\gamma$ correction processing with respect to the luminance information Ysym input from the luminance combination unit 41 and outputs the luminance information Ysym that has been subjected to the $\gamma$ correction processing to the RGB conversion unit 43.

The RGB conversion unit 43 generates a single color image in which each pixel has color information of R, G, or B in each frame period and outputs the color image to the latter stage on the basis of the color difference information Cb and Cr from the YCC conversion unit 40 and the luminance information Ysym from the $\gamma$ correction unit 42, the luminance information Ysym having been subjected to the $\gamma$ correction processing.

<Color Image Generation Processing Performed by Camera DSP Unit 14>

Next, FIG. 9 is a flowchart showing color image generation processing performed by the camera DSP unit 14.

This color image generation processing is executed in each frame period, and it is assumed that two subframe images SF1 and SF2 are input to the camera DSP unit 14 from the CMOS 13 in a single frame period.

In Step S1, two subframe images input from the CMOS 13 in a single frame period are sorted into the infrared image processing system or the visible image processing system. Specifically, the subframe image SF1 is sorted into the infrared image processing system, and processing from Step S2 to S4 is performed. Further, the subframe image SF2 is sorted into the visible image processing system, and processing from Step S5 to S9 is performed.

In the infrared image processing system, in Step S2, the 3DNR unit 33 performs 3DNR processing with respect to an infrared image (subframe image SF1) input from the CMOS 13, outputs the infrared image that has been subjected to the 3DNR processing to the demosaicing unit 34, and overwrites and records the infrared image on the memory 16.

In Step S3, the demosaicing unit 34 extracts luminance information Yir of each pixel from the infrared image (RAW data) that has been subjected to the 3DNR processing and outputs the luminance information to the 2DNR unit 35 and the luminance combination unit 41. In Step S4, the 2DNR unit 35 performs two-dimensional noise reduction processing with respect to the luminance information Yir of the infrared image, thereby extracting a low-frequency component thereof, and outputs luminance information Yir_NR obtained as a result thereof to the luminance combination unit 41.

In the visible image processing system, in Step S5, the 3DNR unit 36 performs 3DNR processing with respect to a visible image (subframe image SF2) input from the CMOS 13, outputs the visible image that has been subjected to the 3DNR processing to the demosaicing unit 37, and overwrites and records the visible image on the memory 15.

In Step S6, the demosaicing unit 37 converts image signals (RAW data) that have been subjected to the 3DNR processing into RGB data and outputs the RGB data to the WB unit 38. In Step S7, the WB unit 38 performs white balance processing with respect to the image signals (RGB data) and outputs the image signals to the 2DNR unit 39.

In Step S8, the 2DNR unit 39 performs 2DNR processing with respect to the visible image (RGB data) that has been subjected to the white balance processing and outputs the visible image to the YCC conversion unit 40. In Step S9, the YCC conversion unit 40 converts the visible image (RGB data) that has been subjected to the 2DNR processing into a visible image (YCC data), outputs luminance information Yc to the luminance combination unit 41, and outputs color difference information Cb and Cr to the RGB conversion unit 43.

In the color image generation system that has acquired processing results from the infrared image processing system and the visible image processing system, in Step S10, the luminance combination unit 41 calculates luminance information Ysym of a color image to be generated at the latter stage on the basis of the luminance information Yir and the luminance information Yir_NR of the infrared image input from the infrared image processing system and the luminance information Yc of the visible image input from the visible image processing system and outputs the luminance information to the $\gamma$ correction unit 42. In Step S11, the $\gamma$ correction unit 42 performs $\gamma$ correction processing with respect to the luminance information Ysym input from the luminance combination unit 41 and outputs the luminance information Ysym that has been subjected to the $\gamma$ correction processing to the RGB conversion unit 43.

In Step S12, the RGB conversion unit 43 generates a single color image in which each pixel has color information of R, G, or B in each frame period on the basis of the color difference information Cb and Cr from the YCC conversion unit 40 and the luminance information Ysym from the γ correction unit 42, the luminance information Ysym having been subjected to the γ correction processing, and outputs the single color image to the latter stage. Hereinabove, description of the color image generation processing is terminated.

According to the color image generation processing described above, it is possible to generate a color image in which color reproduction is highly accurate on the basis of an infrared image and a visible image output from the CMOS 13 of the focal-plane readout method.

<Second Example of Exposure Periods and Readout Timings of Electric Charge Signals in CMOS 13>

Next, FIG. 10 shows a second example of exposure periods of each line in the sensor array 21 of the CMOS 13 and readout timings of electric charge signals obtained in the exposure periods.

In the second example of FIG. 10, the time t2 at which the readout period 1 is started and the time t3 at which the readout period 1 is terminated are early, as compared with the first example in FIG. 4. Therefore, in the second example, the subframe period 1 is short and the subframe period 2 is long, as compared with the first example. Further, in the second example, the all-line exposure period 1 is short and the all-line exposure period 2 is long, as compared with the first example.

<Second Example of Irradiation Timing of Infrared Light in Light Projection System>

Next, FIGS. 11A, 11B and 11C show a second example of an irradiation timing of infrared light in the light projection system. This irradiation timing is set in accordance with the second example of exposure periods and readout timings of electric charge signals in the CMOS 13 of FIG. 10.

In the second example of FIGS. 11A, 11B and 11C, as well as in the first example in FIGS. 5A, 5B and 5C, irradiation with infrared light is on in the all-line exposure period 1 from the time t1 to the time t2, and irradiation with infrared light is off in a period other than the all-line exposure period 1.

Therefore, in this second example, as well as in the first example, an infrared image (subframe image SF1) is an image in which the whole screen is equally bright and a shift in the vertical direction does not occur. Further, the exposure time is short, as compared with the first example, and therefore the infrared image is an image in which movement blurring of a moving subject is further suppressed.

Furthermore, in this second example, an exposure period of a visible image (subframe image SF2) is long, as compared with the first example, and therefore it is possible to improve sensitivity of the visible image. As a result, it is possible to improve reproducibility of color difference information based on the visible image.

Note that, in this second example, an irradiation period of infrared light is short, as compared with the first example, and therefore intensity of infrared light may be set to be high accordingly.

<Modification Example>

Hereinafter, a modification example of the embodiment of the present disclosure described above will be described.

Figure 12A:
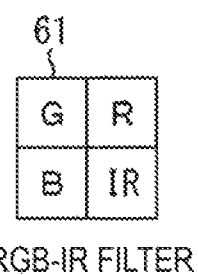
FIGS. 12A and 12B are views showing a modification example of arrangement of color in a color filter of a CMOS.
Figure 12B:
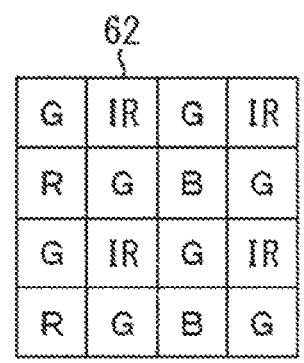

FIGS. 12A, 12B, 13A, and 13B show a modification example of the color filter 21a covering a light-receiving surface of the CMOS 13. In the above description, the color filter 21a is made up of color filters of R, G, and B based on the Bayer array. However, instead of the color filter 21a, an RGB-IR filter 61 or 62 made up of color filters of R, G, and B and an IR filter that transmits infrared light, which is shown in FIG. 12A or FIG. 12B, may be employed. In a case where the RGB-IR filter 61 or 62 is employed, a value obtained from an IR pixel may be used as a pixel value of an infrared image, and values obtained by IR signal subtraction processing (processing for subtracting a pixel value of an IR pixel from pixel values of R, G, and B pixels) may be used as pixel values of a visible image.

Further, an RGB-W filter 63 or 64 made up of color filters of R, G, and B and a part in which no filter is provided so that the whole visible light range is transmitted, which is shown in FIG. 13A or FIG. 13B, may be employed. For example, in a case where the RGB-W filter 63 is employed, values calculated by calculation processing of the following expressions (1) to (4) may be used as a pixel value IR of an infrared image and pixel values R, G, and B of a visible image on the basis of, for example, pixel signals RIR, GIR, BIR, and WIR of pixels R, G, B, and W.

$$IR=(R_{IR}+G_{IR}+B_{IR}-W_{IR})/2 \quad (1)$$

$$R=R_{IR}-IR \quad (2)$$

$$G=G_{IR}-IR \quad (3)$$

$$B=B_{IR}-IR \quad (4)$$

Note that the pixel signals $R_{IR}$, $G_{IR}$, $B_{IR}$, and $W_{IR}$ are expressed by the following expressions (5) to (8).

$$R_{IR}=R+IR \quad (5)$$

$$G_{IR}=G+IR \quad (6)$$

$$B_{IR}=B+IR \quad (7)$$

$$W_{IR}=R+G+B+IR \quad (8)$$

Furthermore, because the RGB-IR filter 61 or 62 or the RGB-W filter 63 or 64 is employed, it is possible to perform separation between infrared light that does not emitted from the IR irradiation unit 18 and exists in an environment and visible light, which cannot be performed in a color filter in the Bayer array.

Further, in a case where the RGB-IR filter 61 or 62 or the RGB-W filter 63 or 64 is employed, the demosaicing unit 34 may generate the luminance information Yir only on the basis of the pixel value IR that is an infrared component. Alternatively, the luminance information Yir may be generated on the basis of not only the pixel value IR but also the pixel values R, G, and B that are visible components.

Furthermore, in the above embodiment, color information used to generate a color image is extracted only from a visible image. However, color components may also be extracted from an infrared image and may be used to generate a color image. Specifically, in a case where the RGB-IR filter 61 or 62 shown in FIG. 12A or FIG. 12B is employed in the CMOS 13 and an infrared image is subjected to IR signal subtraction processing, it is possible to extract color information of only visible light. When this color information extracted from infrared light and color information extracted from a visible image are combined and are used to generate a color image, it is possible to obtain a color image having higher color reproducibility.

Further, in the examples in FIGS. 5A, 5B and 5C and FIGS. 11A, 11B and 11C, there has been described an example where irradiation with infrared light is on over the whole period of the all-line exposure period 1. However, it is also possible to cause irradiation with infrared light to be on in only part of the all-line exposure period 1. Furthermore, for example, it is also possible to repeat on and off of irradiation with infrared light a plurality of times in the all-line exposure period 1.

Furthermore, for example, a removable IR cut-off filter for blocking infrared light may be provided between the lens 11 and the IR bandpass filter 12 or between the IR bandpass filter 12 and the CMOS 13. Then, for example, the IR cut-off filter is inserted in the daytime, i.e., in a period of time in which a surrounding environment is bright, and a color image obtained by the CMOS 13 may be used as it is, and, in a period of time other than the above period of time, i.e., in a period of time in which a surrounding environment is dark, the IR cut-off filter may be removed and a color image may be generated by the above processing.

Note that the wording "all lines" in the embodiment of the present disclosure means all lines of a part appearing as an image and excludes a line in which dummy pixels and the like are arranged.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 14:
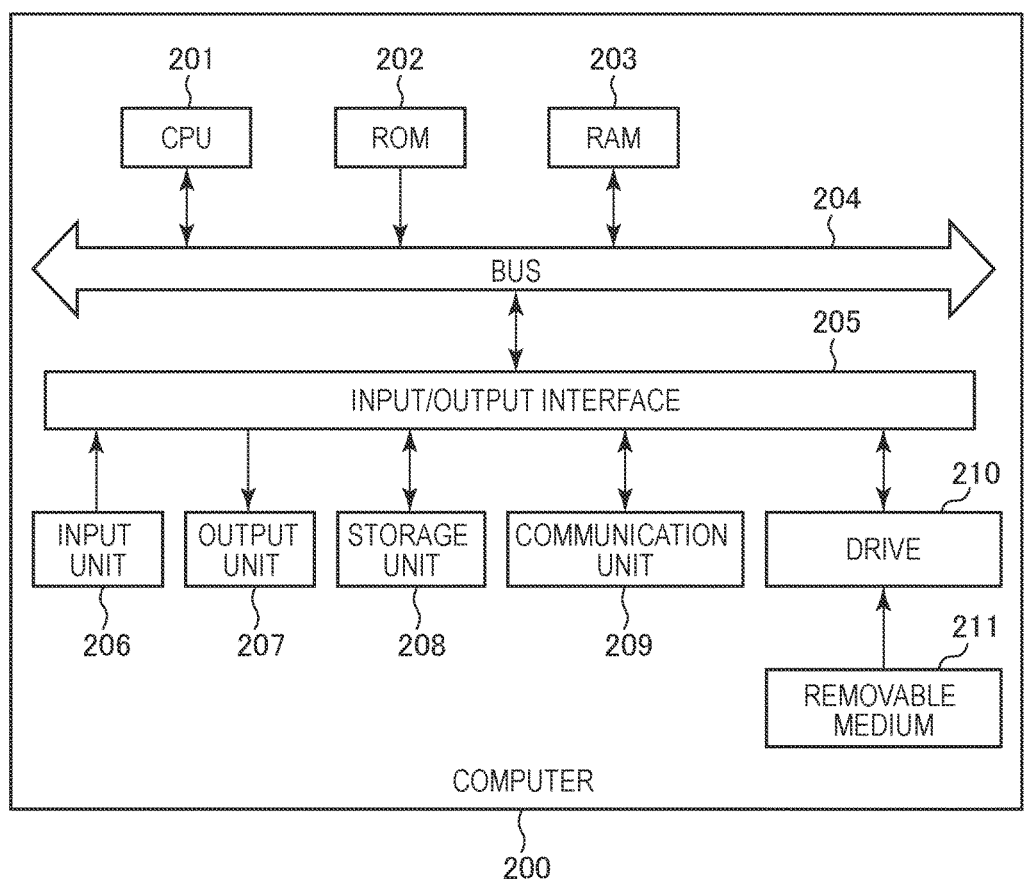
FIG. 14 is a block diagram showing an example configuration of a computer.

FIG. 14 is a block diagram showing an example configuration of the hardware of a computer that executes the series of processes described earlier according to a program.

In a computer 200, a CPU 201, a ROM (Read Only Memory) 202, and a RAM (Random Access Memory) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone, or the like. The output unit 207 is configured from a display, a speaker or the like. The storage unit 208 is configured from a hard disk, a non-volatile memory or the like. The communication unit 209 is configured from a network interface or the like. The drive 210 drives a removable medium 211 such as a magnetic disk, an optical disk, a magneto-optical disk, a semiconductor memory or the like.

In the computer 200 configured as described above, as one example the CPU 201 loads a program recorded in the storage unit 208 via the input/output interface 205 and the bus 204 into the RAM 203 and executes the program to carry out the series of processes described earlier.

As one example, the program executed by the computer 200 (the CPU 201) may be provided by being recorded on the removable medium 211 as a packaged medium or the like. The program can also be provided via a wired or wireless transfer medium, such as a local area network, the Internet, or a digital satellite broadcast.

Note that the program executed by the computer 200 may be a program in which processes are carried out in a time series in the order described in this specification or may be a program in which processes are carried out in parallel or at necessary timing, such as when the processes are called.

An embodiment of the disclosure is not limited to the embodiments described above, and various changes and modifications may be made without departing from the scope of the disclosure.

Additionally, the present technology may also be configured as below.

(1)
An imaging device including:
an imaging element configured to read out, in a first readout period that is part of a first subframe period in a single frame period corresponding to a predetermined frame rate, first electric charge signals of pixels in each line with a focal-plane readout method, read out, in a second readout period that is part of a second subframe period in the single frame period, second electric charge signals of the pixels in each line with the focal-plane readout method, generate a first subframe image on the basis of the first electric charge signals, and generate a second subframe image on the basis of the second electric charge signals;
an irradiation control unit configured to perform control such that, in an irradiation period that is the whole or part of a period other than the first readout period in the first subframe period, an imaging range is irradiated with infrared light and, in a period other than the irradiation period, the imaging range is not irradiated with infrared light; and
a color image generation unit configured to generate a color image at the predetermined frame rate on the basis of the first subframe image and the second subframe image.

(2)
The imaging device according to (1),
in which the first subframe period is shorter than the second subframe period.

(3)
The imaging device according to (1) or (2),
in which pixels in all lines are simultaneously exposed in the period other than the first readout period in the first subframe period and a period other than the second readout period in the second subframe period.

(4)
The imaging device according to any of (1) to (3),
in which the color image generation unit further includes
a first image conversion unit configured to extract luminance information from the first subframe image,
a second image conversion unit configured to extract color difference information from the second subframe image, and
a third image conversion unit configured to convert the luminance information of the first subframe image and the color difference information of the second subframe image into color information of the color image.

(5)
The imaging device according to (4), in which
the second image conversion unit also extracts luminance information from the second subframe image, and
the third image conversion unit converts the luminance information of the first subframe image, the luminance information being corrected by using the luminance information of the second subframe image, and the color difference information of the second subframe image into the color information of the color image.

(6)
The imaging device according to any of (1) to (5), in which
the color image generation unit further includes
a first 3DNR unit configured to perform 3DNR processing including time-direction processing with respect to the first subframe image, and
a second 3DNR unit configured to perform 3DNR processing including time-direction processing with respect to the second subframe image, and
a feedback factor in the time-direction processing in the first 3DNR unit is different from a feedback factor in the time-direction processing in the second 3DNR unit.

(7)
The imaging device according to (6),
in which the second 3DNR unit performs the 3DNR processing with respect to the second subframe image by using a moving-subject detection result supplied from the first 3DNR unit.

(8)
The imaging device according to (7),
in which the color image generation unit further includes a 2DNR unit configured to perform 2DNR processing with respect to the second subframe image by using an edge detection result supplied from the first 3DNR unit.

(9)
The imaging device according to any of (1) to (8),
in which a light-receiving surface of the imaging element is covered with a color filter in a Bayer array, an RGB-IR filter, or an RGB-W filter.

(10)
The imaging device according to any of (1) to (9), further including
an infrared light irradiation unit configured to perform irradiation with the infrared light.

(11)
An imaging method including:
a generation step of reading out, in a first readout period that is part of a first subframe period in a single frame period corresponding to a predetermined frame rate, first electric charge signals of pixels in each line with a focal-plane readout method, reading out, in a second readout period that is part of a second subframe period in the single frame period, second electric charge signals of the pixels in each line with the focal-plane readout method, generating a first subframe image on the basis of the first electric charge signals, and generating a second subframe image on the basis of the second electric charge signals;
an irradiation control step of performing control such that, in an irradiation period that is the whole or part of a period other than the first readout period in the first subframe period, an imaging range is irradiated with infrared light and, in a period other than the irradiation period, the imaging range is not irradiated with infrared light; and
a color image generation step of generating a color image at the predetermined frame rate on the basis of the first subframe image and the second subframe image.

(12)
A program for causing a computer to execute processing including
a generation step of reading out, in a first readout period that is part of a first subframe period in a single frame period corresponding to a predetermined frame rate, first electric charge signals of pixels in each line with a focal-plane readout method, reading out, in a second readout period that is part of a second subframe period in the single frame period, second electric charge signals of the pixels in each line with the focal-plane readout method, generating a first subframe image on the basis of the first electric charge signals, and generating a second subframe image on the basis of the second electric charge signals,
an irradiation control step of performing control such that, in an irradiation period that is the whole or part of a period other than the first readout period in the first subframe period, an imaging range is irradiated with infrared light and, in a period other than the irradiation period, the imaging range is not irradiated with infrared light, and
a color image generation step of generating a color image at the predetermined frame rate on the basis of the first subframe image and the second subframe image.

(13)
An image processing device that accepts input of a first subframe image and a second subframe image from an imaging element configured to read out, in a first readout period that is part of a first subframe period in a single frame period corresponding to a predetermined frame rate, first electric charge signals of pixels in each line with a focal-plane readout method, read out, in a second readout period that is part of a second subframe period in the single frame period, second electric charge signals of the pixels in each line with the focal-plane readout method, generate the first subframe image on the basis of the first electric charge signals, and generate the second subframe image on the basis of the second electric charge signals, the image processing device including:
an irradiation control unit configured to perform control such that, in an irradiation period that is the whole or part of a period other than the first readout period in the first subframe period, an imaging range is irradiated with infrared light and, in a period other than the irradiation period, the imaging range is not irradiated with infrared light; and
a color image generation unit configured to generate a color image at the predetermined frame rate on the basis of the first subframe image and the second subframe image.

REFERENCE SIGNS LIST 10 imaging device
13 CMOS image sensor
14 camera DSP unit
17 IR drive unit
18 IR irradiation unit
21 sensor array
21a color filter
31 timing control unit
32 AE control unit
33 3DNR unit
34 demosaicing unit
35 2DNR unit
36 3DNR unit
37 demosaicing unit
38 WB unit
39 2DNR unit
40 YCC conversion unit
41 luminance combination unit
42 γ correction unit
43 RGB conversion unit
61, 62 RGB-IR filter
63, 64 RGB-W filter
200 computer
201 CPU

The invention claimed is:
1. An imaging device, comprising:
an imaging element configured to:
read, in a first readout period of a first subframe period in a single frame period, a plurality of first electric charge signals of a plurality of pixels in each line of a plurality of lines, wherein
the read of the plurality of first electric charge signals is based on a focal-plane readout method,
the single frame period is between a start of a first exposure in a line of a first subframe of a frame and a termination of a second exposure in a line of a second subframe of the frame, and
the single frame period corresponds to a specific frame rate;

read, in a second readout period of a second subframe period in the single frame period, a plurality of second electric charge signals of the plurality of pixels in each line of the plurality of lines, wherein the read of the plurality of second electric charge signals is based on the focal-plane readout method;

generate a first subframe image based on the plurality of first electric charge signals; and generate a second subframe image based on the plurality of second electric charge signals; and a central processing unit (CPU) configured to:

control an emission of an infrared light such that an imaging range is irradiated with the infrared light in an irradiation period and the imaging range is not irradiated with the infrared light in a first period, wherein the first period is different from the irradiation period, and the irradiation period corresponds to a second period of the first subframe period different from the first readout period;

execute a first three-dimensional noise reduction (3DNR) processing operation on the first subframe image to obtain a processed first subframe image, wherein the first 3DNR processing operation includes a first time-direction processing operation with respect to the first subframe image;

execute a second 3DNR processing operation on the second subframe image to obtain a processed second subframe image, wherein the second 3DNR processing operation includes a second time-direction processing operation with respect to the second subframe image, and a feedback factor in the first time-direction processing operation is different from a feedback factor in the second time-direction processing operation; and generate a color image at the specific frame rate based on the processed first subframe image and the processed second subframe image.

2. The imaging device according to claim 1, wherein the first subframe period is shorter than the second subframe period.

3. The imaging device according to claim 1, wherein the plurality of pixels in each line of the plurality of lines is concurrently exposed in the second period of the first subframe period and a third period of the second subframe period, and the third period is different from the second readout period.

4. The imaging device according to claim 1, wherein the CPU is further configured to:

extract first luminance information from the first subframe image;

extract color difference information from the second subframe image; and convert the first luminance information of the first subframe image and the color difference information of the second subframe image into color information of the color image.

5. The imaging device according to claim 4, wherein the CPU is further configured to:

extract second luminance information from the second subframe image;

correct the first luminance information based on the second luminance information of the second subframe image; and convert the corrected first luminance information and the color difference information of the second subframe image into the color information of the color image.

6. The imaging device according to claim 1, wherein the CPU is further configured to execute the second 3DNR processing operation with respect to the second subframe image based on a moving-subject detection result.

7. The imaging device according to claim 6, wherein the CPU is further configured to execute a 2DNR processing operation with respect to the second subframe image based on an edge detection result.

8. The imaging device according to claim 1, wherein one of a color filter in a Bayer array, an RGB-IR filter, or an RGB-W filter is on a light receiving surface of the imaging element.

9. The imaging device according to claim 1, further comprising an infrared light emitter configured to irradiate the imaging range with the infrared light.

10. An imaging method, comprising:

reading, in a first readout period of a first subframe period in a single frame period, a plurality of first electric charge signals of a plurality of pixels in each line of a plurality of lines, wherein the reading of the plurality of first electric charge signals is based on a focal-plane readout method, the single frame period is between a start of a first exposure in a line of a first subframe of a frame and a termination of a second exposure in a line of a second subframe of the frame, and the single frame period corresponds to a specific frame rate;

reading, in a second readout period of a second subframe period in the single frame period, a plurality of second electric charge signals of the plurality of pixels in each line of the plurality of lines, wherein the reading of the plurality of second electric charge signals is based on the focal-plane readout method;

generating a first subframe image based on the plurality of first electric charge signals;

generating a second subframe image based on the plurality of second electric charge signals;

controlling an emission of an infrared light such that an imaging range is irradiated with the infrared light in an irradiation period and the imaging range is not irradiated with the infrared light in a first period, wherein the first period is different from the irradiation period, and the irradiation period corresponds to a second period of the first subframe period different from the first readout period;

executing a first three-dimensional noise reduction (3DNR) processing operation on the first subframe image to obtain a processed first subframe image, wherein the first 3DNR processing operation includes a first time-direction processing operation with respect to the first subframe image;

executing a second 3DNR processing operation on the second subframe image to obtain a processed second subframe image, wherein the second 3DNR processing operation includes a second time-direction processing operation with respect to the second subframe image, and a feedback factor in the first time-direction processing operation is different from a feedback factor in the second time-direction processing operation; and generating a color image at the specific frame rate based on the processed first subframe image and the processed second subframe image.

11. A non-transitory computer-readable medium having stored thereon computer-executable instructions that, when executed by a processor, cause the processor to execute operations, the operations comprising:
reading, in a first readout period of a first subframe period in a single frame period, a plurality of first electric charge signals of a plurality of pixels in each line of a plurality of lines, wherein
the reading of the plurality of first electric charge signals is based on a focal-plane readout method,
the single frame period is between a start of a first exposure in a line of a first subframe of a frame and a termination of a second exposure in a line of a second subframe of the frame, and
the single frame period corresponds to a specific frame rate;
reading, in a second readout period of a second subframe period in the single frame period, a plurality of second electric charge signals of the plurality of pixels in each line of the plurality of lines, wherein
the reading of the plurality of second electric charge signals is based on the focal-plane readout method;
generating a first subframe image based on the plurality of first electric charge signals;
generating a second subframe image based on the plurality of second electric charge signals,
controlling an emission of an infrared light such that an imaging range is irradiated with the infrared light in an irradiation period and the imaging range is not irradiated with the infrared light in a first period, wherein
the first period is different from the irradiation period, and
the irradiation period corresponds to a second period of the first subframe period different from the first readout period;
executing a first three-dimensional noise reduction (3DNR) processing operation on the first subframe image to obtain a processed first subframe image,
wherein the first 3DNR processing operation includes a first time-direction processing operation with respect to the first subframe image;
executing a second 3DNR processing operation on the second subframe image to obtain a processed second subframe image, wherein
the second 3DNR processing operation includes a second time-direction processing operation with respect to the second subframe image, and
a feedback factor in the first time-direction processing operation is different from a feedback factor in the second time-direction processing operation; and
generating a color image at the specific frame rate based on the processed first subframe image and the processed second subframe image.

12. An image processing device, comprising:
a central processing unit (CPU) configured to:
receive a first subframe image and a second subframe image from an imaging element, wherein
the imaging element:
reads, in a first readout period of a first subframe period in a single frame period, a plurality of first electric charge signals of a plurality of pixels in each line of a plurality of lines, wherein
the read of the plurality of first electric charge signals is based on a focal-plane readout method,
the single frame period is between a start of a first exposure in a line of a first subframe of a frame and a termination of a second exposure in a line of a second subframe of the frame, and
the single frame period corresponds to a specific frame rate;
reads, in a second readout period of a second subframe period in the single frame period, a plurality of second electric charge signals of the plurality of pixels in each line of the plurality of lines, wherein
the read of the plurality of second electric charge signals is based on the focal-plane readout method;
generates the first subframe image based on the plurality of first electric charge signals; and
generates the second subframe image based on the plurality of second electric charge signals;
control an emission of an infrared light such that an imaging range is irradiated with the infrared light in an irradiation period and the imaging range is not irradiated with the infrared light in a first period, wherein
the first period is different from the irradiation period, and
the irradiation period corresponds to a second period of the first subframe period different from the first readout period;
execute a first three-dimensional noise reduction (3DNR) processing operation on the first subframe image to obtain a processed first subframe image,
wherein the first 3DNR processing operation includes a first time-direction processing operation with respect to the first subframe image;
execute a second 3DNR processing operation on the second subframe image to obtain a processed second subframe image, wherein
the second 3DNR processing operation includes a second time-direction processing operation with respect to the second subframe image, and
a feedback factor in the first time-direction processing operation is different from a feedback factor in the second time-direction processing operation; and
generate a color image at the specific frame rate based on the processed first subframe image and the processed second subframe image.

* * * * *